Aug. 22, 1961     A. MINELLA     2,996,728
TOILET TANK, BOWL, AND ADAPTER CONNECTION
Filed Jan. 28, 1957     4 Sheets-Sheet 1

*INVENTOR*
ANGELO MINELLA

BY    Wm. E. Ford

ATTORNEY

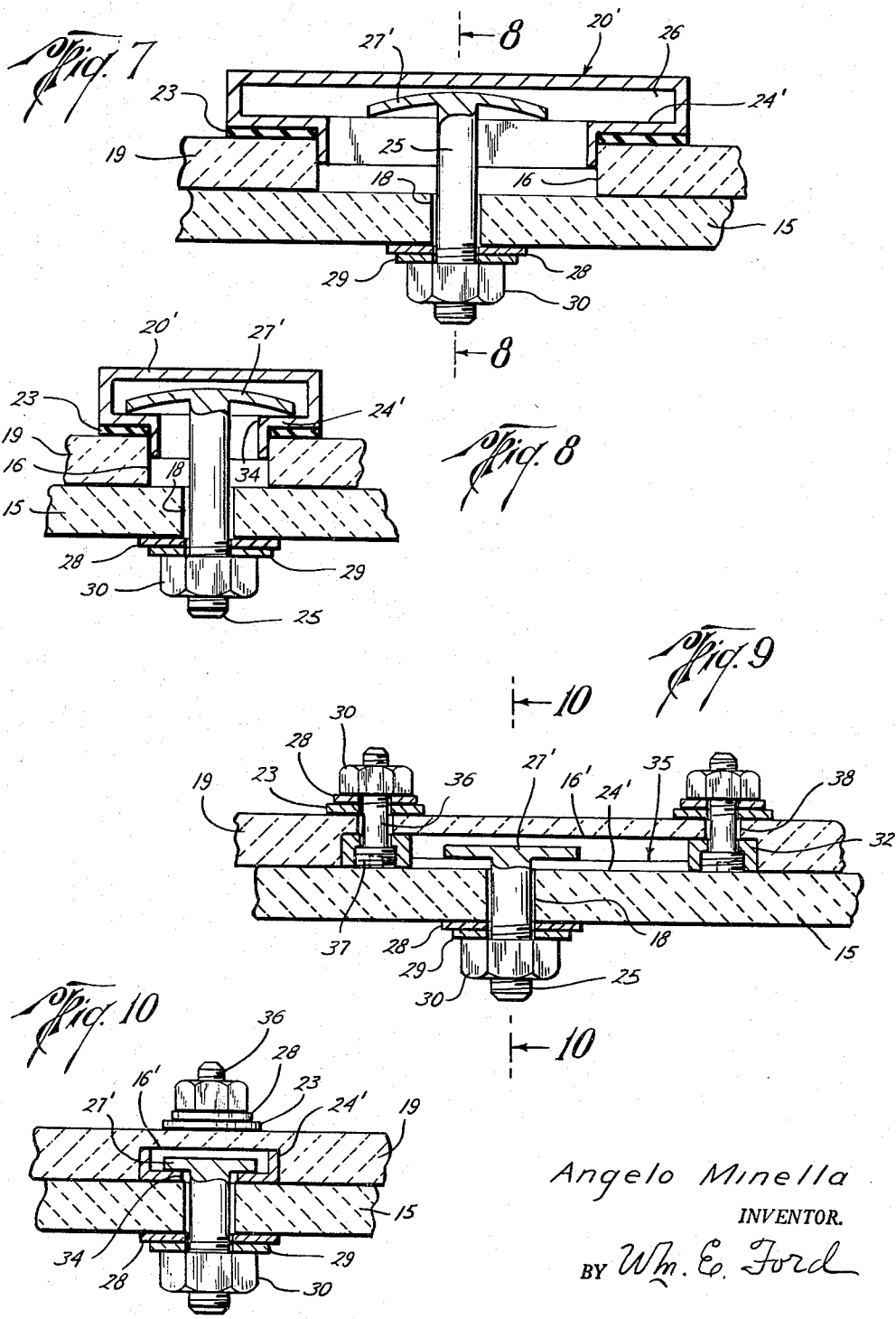

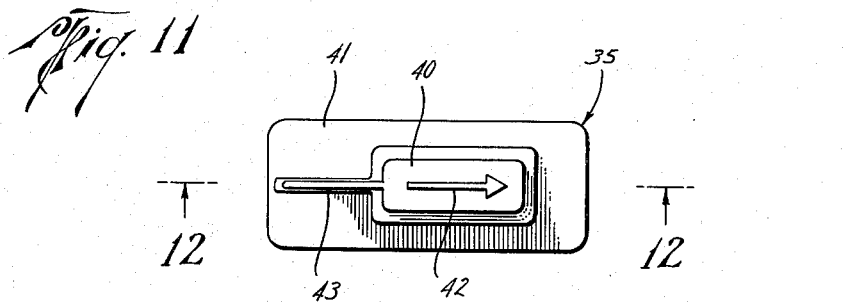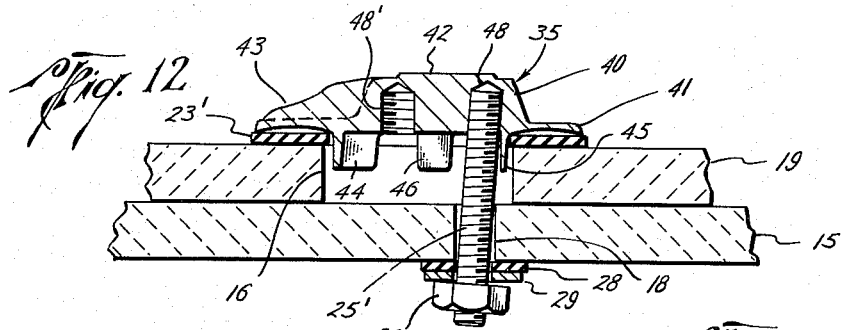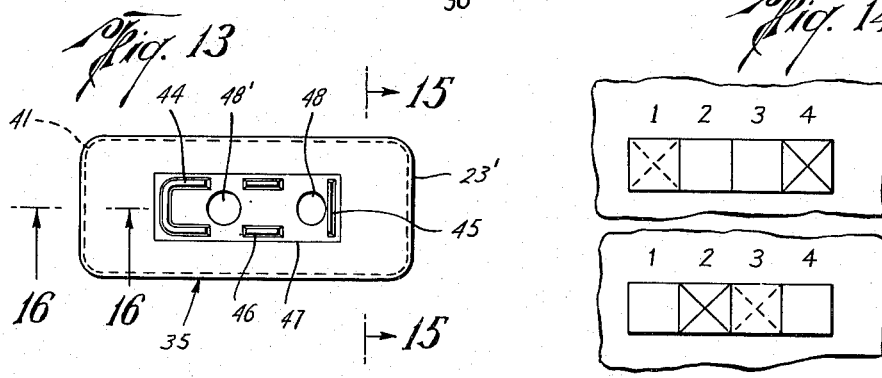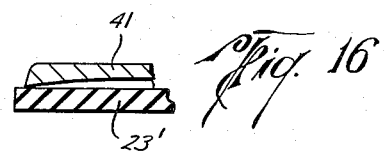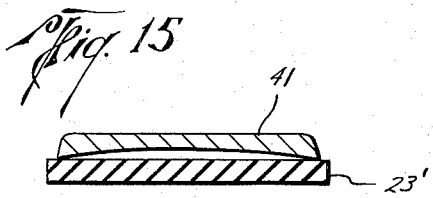
Angelo Minella
INVENTOR.
BY Wm. E. Ford
ATTORNEY

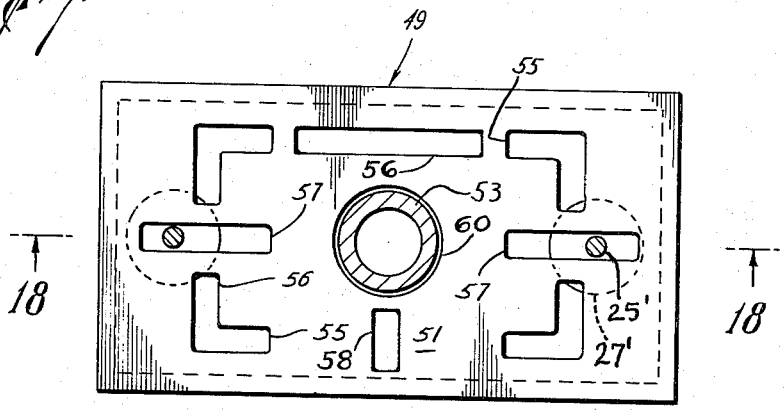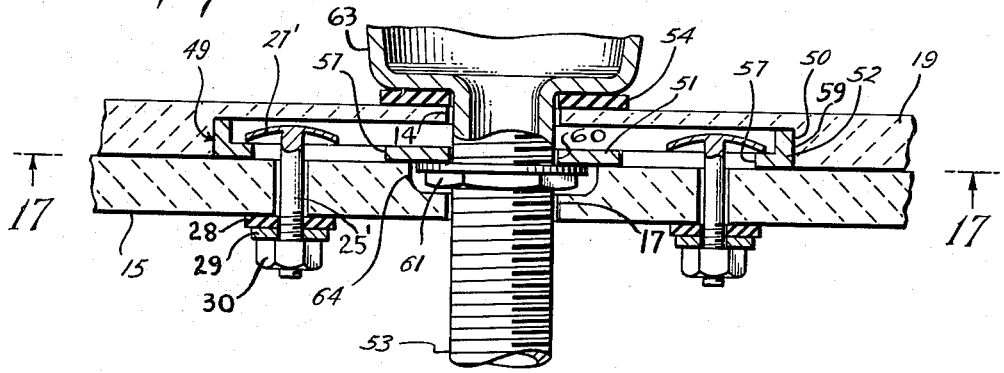

United States Patent Office 2,996,728
Patented Aug. 22, 1961

2,996,728
TOILET TANK, BOWL, AND ADAPTER
CONNECTION
Angelo Minella, Houston, Tex., assignor to A. Minella
Plumbing Supplies, Houston, Tex.
Filed Jan. 28, 1957, Ser. No. 636,721
4 Claims. (Cl. 4—68)

This invention relates to a toilet tank and bowl, and to an adapted connection therefor, and to a method of connection whereby tanks of various makes having connection openings in the bottom thereof variously spaced from the discharge opening centrally therein, may be assembled with toilet bowls of various makes having connection openings in the top thereof variously spaced from the inlet opening therein; the instant application constituting a continuation-in-part application of my copending application Serial No. 613,085, filed October 1, 1956, which issued as Patent No. 2,930,049, dated March 29, 1960, for Toilet Tank, Bowl, and Adapter Connection and Method of Connection.

It is therefore a primary object of this invention to provide toilet tanks, toilet bowls, and adapter connections therefor, and a method of connection whereby toilet tanks of various makes may be assembled with toilet bowls of various makes by virtue of tank and/or bowl construction and adapter connections therefor.

It is another object of this invention to provide such a construction and method, whereby adapter connections may be made between tanks and bowls of various makes with a minimum effort, and a minimum of special equipment.

Other and further objects will be apparent when the specification herein is considered in connection with the drawings in which:

FIG. 7 is a sectional elevation through another modification of the invention;

FIG. 8 is a transverse sectional view taken along line 8—8 of FIG. 7;

FIG. 9 is a sectional elevation of still another modification of the invention;

FIG. 10 is a transverse sectional view taken along 10—10 of FIG. 9;

FIG. 11 is a plan view of still another modification of the invention.

FIG. 12 is a sectional elevation taken along line 12—12 of FIG. 11;

FIG. 13 is a bottom view taken along 13—13 of FIG. 12;

FIG. 14 is a diagrammatic view of the manner in which the adapter best shown in FIG. 12 covers the extent of the tank slot by employment of the two tapped holes therein in various positions;

FIG. 15 is a sectional view taken along line 15—15 of FIG. 13;

FIG. 16 is a sectional view taken along line 16—16 of FIG. 13;

FIG. 17 is a bottom view of a composite adapter insertable in a tank bottom taken along line 17—17 of FIG. 18; and FIG. 18 is a sectional elevation taken along line 18—18 of FIG. 17.

Figure 1:
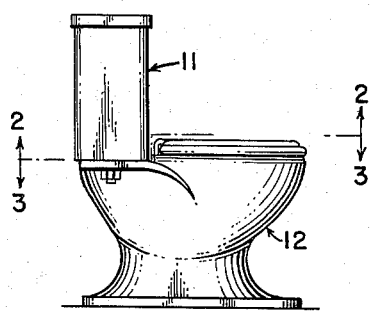
FIG. 1 is an elevation of an assembled toilet tank and bowl modified in accordance with the invention.

Referring in detail to the drawings, a tank 11 is shown in FIG. 1 installed upon a bowl 12, both tank and bowl being of conventional toilet size and construction except as hereinbelow described as to novelty. In the bottom view of the tank shown in FIG. 2 a central discharge passage or outlet or opening 14 is shown centrally of the bottom or base closure 19 of the tank, and equally longitudinally spaced on either side thereof slots 16 are provided in the base or tank bottom. Also the bowl 12 shown in FIG. 3 has a central passage or inlet 17 therein in the top 15 thereof and equally longitudinally spaced on either side thereof slots 18 are provided.

In practice it often happens that because of strikes, priorities and scarceties during emergency periods, or in booming building periods, it is not always possible to obtain the same make of toilet tank and bowl for assembly, with the consequence that a bowl of one manufacturer must be assembled with a tank of another manufacturer. In such cases the conventional round openings conventionally provided in tanks and bowls in place of the slots 16 and 18 hereinabove described may vary in spacing from the central opening 14 or 17, respectively, so that the round openings in tank base and top of bowl do not coincide. Obviously, as set forth within the scope of the preceding sentence, connection may be made when the tank has slots while the bowl has only round holes or openings, or conversely when the bowl has slots while the tank has only round holes or openings.

In such case the material, usually porcelain, of which tank and bowl are constructed, does not readily lend itself to permitting extension of such round openings to provide coincidence between such tank and bowl openings, with the consequence that it is often difficult to assemble toilets and bowls when provided by different manufacturers having different spacing practices.

Figure 2:
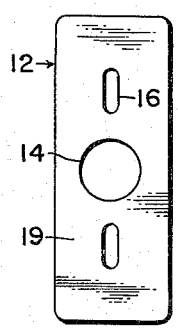
FIG. 2 is a bottom view of a tank modified in accordance with this invention.
Figure 3:
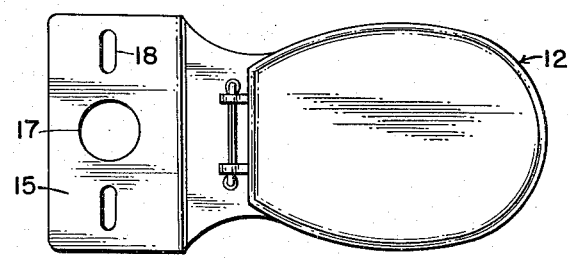
FIG. 3 is a plan view of a bowl modified in accordance with this invention.
Figure 6:
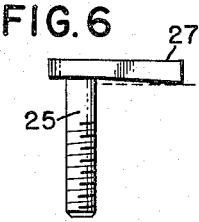
FIG. 6 is an elevation of the special bolt included in the adapter.
Figure 4:
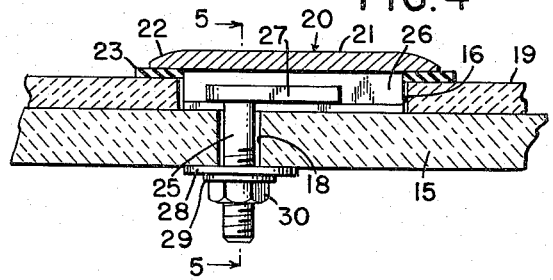
FIG. 4 is a longitudinal sectional elevation of an adapter connection for adapting the toilet tank of FIG. 2 to a conventional toilet bowl.
Figure 5:
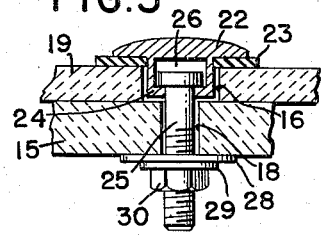
FIG. 5 is a transverse sectional elevation taken along section 5—5 of FIG. 4.

In order to accomplish the adaptation of the tank of FIG. 2 to a bowl, as shown in FIG. 3, or to a conventional bowl, an adapter or adapter connection as shown in FIGS. 4–6 is provided. Such an adapter connection as shown in FIGS. 4–6 is provided. Such an adapter 20 comprises a slot insert 21 having a flange 22 of larger area than the slot 16 to fit there around on a gasket 23 and a bolt head support 24 comprising two (2) oppositely facing sections of L-shape cross-section depending from the flange 22 and spaced apart slightly more than the diameter of a connection means or bolt 25, the head of which is insertable in the slot 26 provided between the L's, so that the head 27 of the bolt shoulders on the upper faces of the lower legs of the L's. The head 27 is elongated to extend in one direction substantially beyond the body or shank of the bolt 25 to bear upon the L's.

As is conventional, the end of the shank of the bolt 25 is threaded and receives a large washer 28 thereover of size to bear upon the inner face of the bowl top 15 surrounding the opening 18. Optionally, another smaller friction washer 29 may be inserted over the end of the shank of the bolt 25 to bear against the washer 28; then when a nut 30 is threaded on the bolt end to bear on the washer 29, the whole adapter is tightened so that the friction of the flange 22 bears tightly against the top of the gasket 23 to force its lower face tightly against the top surface of the tank bottom 19.

As best seen in FIG. 6, the elongated bolt head 27 has the lower surface thereof to extend downwardly at an angle to the horizontal so that when the nut 30 is tightened the outer end of the bolt head 27 exerts a downward tension on the upper faces of the lower legs of the support L's 24 to firmly bind the tank bottom and bowl top in firm and sealed abutment.

In the modification of the invention shown in FIG. 7, an adapter or adapter connection 20' is shown which comprises a hollow casing of rectangular cross-section in both longitudinal and transverse dimension with the exception that the lower side of the casing has a longitudinally extending slot 34 therein since the walls thereof below the sides comprise two oppositely facing recumbent L's 24' in cross-section.

The upper legs of the L's 24' seat on a gasket 23 and the bottom legs of the L's 24' limit the gasket 23 to only outward expansion under pressure. A connection means or bolt 25 has a head 27' of arcuate contour in both longitudinal and transverse dimensions, and the head is of size and contour to rest upon the bolt head supports 24' on the upper legs of the L's thereof. Thus the adapter 20' may be inserted from the top of the tank 11 and seated as shown in FIGS. 7 and 8 so that the shank of the bolt 25 may be extended through the opening in the bowl therebelow wherever in assembly such opening 18 may be located with relation to the slot 16. Then the nut 30 on the bolt 25 may be tightened to bear on washer 29 which in turn bears on the washer 28, and thus the proper tightened connection is made between the bottom 19 of the tank 11 and the top 15 of the bowl. In this manner the tank may be adapted for connection to the bowl of any make of plumbing, regardless of the spacing of the holes 18 from the vertical axis of the bowl, and vice versa, by reversing the arrangement, and providing the longitudinal slots 16 in the top of the bowl, the same adaptation may be made.

In the variation of FIGS. 9 and 10, a slot 16' is shown which does not extend all of the way through the bottom 19 of the tank 11 but this slot 16' only constitutes a recess in the lower surface of such bottom. The casing of the adapter or adapter connection which fits therein need only comprise the angles or oppositely facing L-shaped members 24' connected at each end to solid blocks of metal 32. The spaced apart angles thus leave a slot or opening 34 therein between, and the casing assembly 35 fits snugly in the recess 16'.

The blocks 32 are drilled and tapped to receive the heads 37 of special connection screws 36 which extend through bores 38 in the tank bottom 19 and receive therethrough the screw shanks 39 of smaller diameter than the heads 37, such shanks passing through gaskets 23 and washers 28 and having nuts 30 threaded on the upper ends thereof to effect connection of the casing assembly 35 into the tank bottom recess 16'.

A bolt 25 having a head 27' to rest upon the upper surfaces of the horizontal legs of the angles 24' has a shank which extends downwardly through the opening 18 in the top 15 of the bowl 12 and through washers 28 and 29, and has the nut 30 threaded on the lower end thereof to effect engaging connection between the bowl of any make of plumbing and the tank of any other make of plumbing, regardless of the spacing of the holes 18 from the vertical axis of the bowl. Conversely with slots in the top of the bowl to receive the adapter or casing assembly 35, adaptation can be made to assemble tanks and bowls in cases where the bottom openings in the tanks, outwardly of the central opening or central member, may vary in spacing from the axis of such central member.

In the form of the invention shown in FIGS. 11–16 an adapter, adapter connection, or adapter block 35 is shown as having a body 40 which has a base flange 41 therearound as best shown in FIGS. 11 and 13. This base flange extends further outwardly on one side than on the other for an obvious purpose. On the under side of the body 40 there is provided a channel shaped downwardly extending member 44, sidewardly extending guide members 46, and a transversely extending guide lug 45 on the opposite side of the members 46 from the channel shaped member 44.

The adapter 35 is positioned on a gasket or sealing member 23' of rubber or the like, such gasket 23' having a rectangular shaped central opening or cut away area 47 therein to fit around a slot 16 provided in the bottom of a tank 19. The channel 44 extends through the gasket 23' into the slot 16 and the sides thereof guide the positioning of the adapter in the slot. The guide members 46 also guide such positioning, as does the guide lug 45, the lug 45 and the cross-member of the channel 44 thus serve as the members adjacent the ends of the slot 16 which limit the movement which can be given the adapter 35 in longitudinal direction of the slot after the adapter is thus positioned.

A gusset or strength member 43 is provided for the end of the flange 41 which extends outwardly fartherest from the body 40 and an arrow 42 is formed on top of the body and the head of the arrow points toward the end of the adapter which has a drilled and tapped hole 48 thereunder directed into the body 40 from underneath and at an angle to the plane of the under surface of the body and flange. Such hole 48 is closely adjacent to the lug 45 as shown in FIGS. 11 and 13. A second hole 48' is drilled and tapped into the body from underneath and substantially perpendicular to, or else at a very slight angle to the plane of such under surface, this hole 48' being under the end of the arrow opposite the point and in the end of the body 40 opposite the end having the hole 48 therein. Such hole 48' is spaced from the cross-member of the channel 44 and adjacent the inner ends of the sides of the channel and between the channel 44 and the side guides 46.

As shown in FIG. 15 the under surface of the flange 41 is dished or slightly concave in transverse dimension, and as shown in FIG. 16 such flange 41 is also dished or concave in longitudinal dimension. Thus when the adapter 35 is installed and drawn against the gasket 23' as will be hereinafter described, the peripheral parts of the flange 41 bite into the gasket 23' and a positive seal is effected.

Since the openings 18 in the tops of bowls are variously spaced from the central connection opening therethrough the slots 16 provided in the bottoms of the tanks are of a length to cover the range of variation of such holes or openings 18 in various makes of bowl. Should the opening 18 in one bowl bear the relationship to the slot 16 as shown in FIG. 12, then the adapter 35 is positioned as shown in such figure, and the stud 25' is threaded into the hole 48 and the nut 30 tightened thereon to bind the washers 29 against the washer 28 and the washer 28 against the under side of the top 15 of the bowl.

As shown in FIG. 14, the slot 16 is divided diagrammatically into areas 1, 2, 3, 4, and when the area of slot 16 overlapping the hole 18 is as shown in FIG. 12, the adapter 35 is positioned with the arrow in direction as shown and the stud 25' is threaded into the angularly extending hole 48' adjacent the arrow point end of the body 40. Thus the overlap of slot and hole occurs in area 4 as designated by the full line X in FIG. 14. As the hole 48' is tapered, when the nut 30 is tightened on the stud 25' the part of the flange 41 adjacent the stud 25' is drawn tightly against the gasket 23' by virtue of the adjacency of such part to the point of force application, while the part of the flange 41 spaced from such part is also drawn tightly against the gasket by virtue of the less than 90° angularity between stud axis and the under surface of the body and flange resulting in the application of a torque action to such spaced flange part.

If the area of overlap is in area 1 as indicated by the dotted line X in FIG. 14, then the adapter is reversed from direction pointed in FIG. 11, while the stud 25' is still threaded into the angularly extending hole 48.

However if the area of overlap falls in area 2 as indicated by the full line X in FIG. 14, the adapter is installed with the arrow pointing as shown in FIG. 11, but the stud is installed in the substantially perpendicularly drilled and tapped hole 48'. In this case, as the point of application of force is spaced some bit from either end of the flange 41, but nearer the longer extending flange end than the shorter end, it can be drilled, the part of the flange nearest the hole 48' will bind the gasket 23' more tightly than the part farther therefrom, but the difference in degree will not be appreciable. Equalization of such forces of application can be arrived even to counteract in great part this slight difference, by drilling the hole 48' to extend also at an angle to the said under surface plane, but at a lesser angle than the angle at which the hole 48 extends.

In case the area of overlap falls in area 3, as shown by the dotted line X in FIG. 14, the adapter 35 is positioned in the slot 16 so that the arrow 42 points opposite to the direction shown in FIG. 11 while the stud 25' is installed in the perpendicularly extending or only slightly angularly extending hole 48'. Thus by selecting the proper combination of direction of adapter installation and the selection of hole in which the stud is installed it is possible to cover the full range of variation of slot areas over tank holes.

Since it is not always the case that tank and bowl connections are made through two pairs of overlapping openings on diametrically opposite sides of the respective central tank and bowl openings 14, 17, but rather some combinations have connections made through four pairs of openings arranged to form a rectangle, and others have combinations of three overlapping pairs of openings substantially equally angularly spaced apart, an adapter 49 may be provided to accommodate such conditions.

Such an adapter or adapter connection 49 is shown in FIGS. 17 and 18 having in the bottom 51 thereof four L-shaped slots 55 provided to define the corners of a rectangle as shown in FIG. 17. Also a slot 56 may be provided to extend along the long side of the rectangle between the side legs of two corner slots 55. Additionally a shorter slot 58 may be provided to extend transversely and on the opposite side of the member 53 from the slot 56. Additionally two longitudinally extending slots 57 may be provided at ninety (90°) degrees from the slot 58 and on opposite sides of the member 53.

The adapter 49 is shaped as a shallow pan or tray with slots in the bottom thereof. A rectangularly shaped recess 50 is provided in the bottom 19 of the tank 11 with sides 59 of the depth of the recess 50 and with the bottom 51 of plate thickness to provide an open space thereabove greater than the height of the heads 27' of the connection bolts 25'. Such bolts 25' are shown in FIGS. 17 and 18 as a pair installed in the slots 57 on diametrically opposite sides of the member 53 which passes through the central opening 60 in the adapter.

The installation shown in FIGS. 17 and 18 is only illustrative of the use of the adapter 49. The bolts 25' would occupy various positions in the slots 55 for arrangements where assembly is made to include the use of four pairs of overlapping openings. Also in case of combinations employing three overlapping pairs of openings, slot 58 could be employed in combination with both ends of slot 56, or slot 56 could be used in combination with the slots 55 on the opposite side of the member 53 therefrom. In all cases a locknut 61 is tightened on the member 53 to draw the upper, flared part 63 of such member in binding contact against the gasket or seal 54 to force the gasket 54 into sealing contact against the tank bottom 19, this being accomplished as the locknut 61 is received in a recess 64 in the bowl top 15, its upper face bearing firmly against the bottom surface of the adapter 49 when the locknut is thus threaded up on such member.

In each form of adaptation shown herein, reversal may be made between the function of the tank bottom 19 and the bowl top 15 without departing from the spirit of the invention. That is, the adapter slot 16 may be provided in the bowl top 15 to underextend range of position variation in openings 18' in the tank bottom 19. In FIGS. 4 and 5 this would amount to no more than turning these views upside down and interchanging reference numerals 15 and 19. Obviously the same type of reversal and interchange would accomplish the same switch of function between tank bottom and bowl top in the modification of FIGS. 7 and 8; the modification of FIGS. 9 and 10; the modification of FIGS. 11–16; and the modification of FIGS. 17 and 18. Obviously in such cases the washer 28 will bear against a gasket corresponding in function with the gasket 23 and such gasket in turn will bear upon the inner or upper surface of the tank bottom.

The invention is not limited to the structural embodiments and connection methods shown, but other embodiments and connection methods are also included as such may fall within the broad spirit of the invention and within the broad scope of interpretation claimed and merited for the appended claims.

What is claimed is:

1. In an assembly of a toilet bowl and a toilet tank in which the tank and bowl provide respective central, communicating opening means in the tank bottom and bowl top, slot means in one element of said tank and bowl assembly and openings in the other thereof, connection stud means extending through said openings for connecting said tank and bowl in assembly, adapter means sealably seating in said one element around said slot means and guidably extending thereinto and providing a tapped hole therein near an end thereof and extending at an angle to the seating surface of said adapter means and another tapped hole therein longitudinally spaced from the first tapped hole and nearer the center thereof and extending at a lesser angle to, or substantially perpendicular to said seating surface, said connection stud means being selectively engageable in said tapped holes and said adapter means being selectively longitudinally reversibly positionable with relation to said slot means whereby connection between tank and bowl may be made over the range of variation of openings means spacing from said central opening means in various makes of openings providing elements.

2. The assembly of two elements comprising a toilet tank and toilet bowl providing respective central communicating fluid passage means therebetween, slot means provided in and extending through one element and longitudinally extending along the axis through said slot means and said passage and equally spaced on opposite sides of said passage, openings provided in and extending through the other of said elements and disposed along an axis parallel to said slot axis and equally spaced on opposite sides of said passage means, adapter means disposed in said slot means and including means to support said adapter means by contact with said slot providing element and having two tapped holes spaced apart along the longitudinal axes of said adapter means and spaced different distances from the respective adapter means end adjacent thereto, removable means cooperative with said adapter means to seal off the interior of said slot means providing element from fluid communication with said slot means, and connection means each having a shank of smaller diameter than the respective opening through which it extends to extend through an opening means and also having enlargement means adjustably positionable upon an end of said shank to be adjustably brought to bear against the side of the opening means providing element opposite said slot means providing element, the other end of said connection means being constructed for cooperation with a tapped hole in a respective adapter means in manner that adjustment of said enlargement means position upon said shank results in said tank and bowl being drawn together in more tightly fitting contact with said shank extending at an angle to opening axis through the opening in which installed to engage a selected tapped hole whereby greater assemblying contact thrust is exerted at predetermined spaced distance from said shank axis than at other distances therefrom, connection between tank and bowl thus being made by such contact and over range of variation of openings spacing from said central passage means for various openings spacing, as encountered in various makes of openings providing elements.

3. The assembly of two elements comprising a toilet tank and toilet bowl providing respective central communicating fluid passage means therebetween, slot means provided in and extending through one element and substantially equally spaced on opposite sides of said passage means, said slot means extending longitudinally along the axis through said slot means and said passage means, openings provided in and extending through the other of said elements and disposed along an axis parallel to said slot means axis and substantially equally spaced on opposite sides of said passage means, said assembly including adapter means disposed in said slot means and said adapter means also including means to support said adapter means by contact with said slot means providing element and having two tapped holes spaced apart along the longitudinal axes of said adapter means and spaced different distances from the respective adapter means end adjacent thereto and also including removable means cooperative with said adapter means to seal off the interior of said slot means providing element from said slot means, said assembly also including connection means each having a shank of smaller diameter than the respective opening through which it extends to extend through an opening means and also having a securing means axially positionable upon an end of said shank to be adjustably brought to bear against the side of the opening means providing element opposite the slot means providing element, the other end of each connection means being constructed for cooperation with a tapped hole in a respective adapter means in manner that adjustment of securing means position upon its shank results in said tank and said bowl being drawn together in more tightly fitting contact with said shank extending at an angle to opening axis through the opening in which installed to engage a selected tapped hole whereby greater assemblying contact thrust is exerted at predetermined spaced distance from said shank axis than at other distances therefrom, connection between tank and bowl thus being made by such contact and over range of variation of openings spacing from said central passage means for various openings spacing as encountered in various makes of openings providing elements.

4. The assembly of two elements comprising a toilet tank and toilet bowl providing respective central communicating fluid passage means therebetween, slot means provided in and extending through one element substantially equally spaced on opposite sides of said passage means, said slot means extending longitudinally along the axis through said slot means and said passage means, openings provided in and extending through the other of said elements and disposed along an axis parallel to said slot axis and substantially equally spaced on opposite sides of said passage means, adapter means disposed in said slot means and said adapter means also including means to support said adapter means by contact with said slot providing element and having two tapped holes spaced apart along the longitudinal axes of said adapter means and spaced different distances from the respective adapter means end adjacent thereto and also including removable means cooperative with said adapter means to seal off the interior of said slot means providing element from said slot means, and connection means each having a shank of smaller diameter than the respective opening through which it extends to extend through an opening means and also having securing means axially positionable upon an end of said shank to be adjustably brought to bear against the side of the opening means providing element opposite said slot means providing element, the other end of said connection means being constructed for cooperation with a tapped hole in a respective adapter means in a manner that adjustment of said securing means position upon said shank results in said tank and said bowl being drawn together in more tightly fitting contact with said shank extending at an angle to opening axis through the opening in which installed to engage a selected tapped hole whereby greater assemblying contact thrust is exerted at predetermined spaced distance from said shank axis than at other distances therefrom, connection between tank and bowl thus being made by such contact and over range of variation of openings spacing from said central passage means for various openings spacing, as encountered in various makes of openings providing elements.

References Cited in the file of this patent

UNITED STATES PATENTS

| | | |
|---|---|---|
| 540,965 | Engel | June 11, 1895 |
| 1,077,221 | Cowan | Oct. 28, 1913 |
| 1,720,370 | McMurray | July 9, 1929 |
| 1,867,118 | Tilden | July 12, 1932 |
| 1,963,709 | McManama | June 19, 1934 |
| 2,096,307 | Pieslak | Oct. 19, 1937 |
| 2,108,625 | Tilden | Feb. 15, 1938 |
| 2,743,460 | Youngstrom et al. | May 1, 1956 |